United States Patent
Wang et al.

(10) Patent No.: US 7,812,862 B2
(45) Date of Patent: Oct. 12, 2010

(54) WHITE BALANCE ADJUSTMENT METHOD FOR A DIGITAL IMAGE CAPTURING DEVICE

(75) Inventors: Po-Min Wang, Taipei (TW); Chiou-Shann Fuh, Taipei (TW); Chun-Nan Yeh, Taipei (TW); Chin-Hsun Wu, Taipei (TW); Ching-Feng Lin, Taipei (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 462 days.

(21) Appl. No.: 11/976,487

(22) Filed: Oct. 25, 2007

(65) Prior Publication Data
US 2008/0100723 A1    May 1, 2008

(30) Foreign Application Priority Data
Oct. 25, 2006  (TW) .............................. 95139401 A

(51) Int. Cl.
*H04N 9/73*  (2006.01)
*H04N 5/228*  (2006.01)
(52) U.S. Cl. ................................. 348/223.1; 348/222.1
(58) Field of Classification Search .............. 348/223.1, 348/222.1, 224.1, 225.1
See application file for complete search history.

(56) References Cited

U.S. PATENT DOCUMENTS

| | | | | |
|---|---|---|---|---|
| 5,177,599 A | * | 1/1993 | Takagi et al. | 348/228.1 |
| 5,298,979 A | * | 3/1994 | Kim | 348/655 |
| 5,442,408 A | * | 8/1995 | Haruki et al. | 348/655 |
| 6,975,115 B1 | * | 12/2005 | Fujita et al. | 324/318 |
| 2003/0002059 A1 | * | 1/2003 | Zaklika et al. | 358/1.9 |

* cited by examiner

*Primary Examiner*—Jason Chan
*Assistant Examiner*—Tuan H Le
(74) *Attorney, Agent, or Firm*—Zhigang Ma

(57) ABSTRACT

A white balance adjustment method for a digital image capturing device is disclosed. The white balance adjustment method comprises the steps of: setting a color temperature estimation area; capturing an image with the digital image capturing device; choosing one or more analysis blocks from the image; determining whether values of Cb and Cr of each analysis block are located in either a color temperature zone or a white zone of the color temperature estimation area; collecting and calculating each point value of each color temperature that is located in the color temperature estimation area to obtaining a final color temperature; and performing a white balance adjustment procedure according to the final color temperature.

16 Claims, 10 Drawing Sheets

US 7,812,862 B2

WHITE BALANCE ADJUSTMENT METHOD FOR A DIGITAL IMAGE CAPTURING DEVICE

BACKGROUND OF THE INVENTION

1. Field of the Invention

The present invention relates to a white balance adjustment method for a digital image capturing device, and more particularly, to a white balance adjustment method that uses color temperature estimation.

2. Description of the Related Art

Generally, colors reflected from an object are determined by the color of the illumination source. The human visual system is able to detect and account for this kind of color change. Therefore, regardless of whether it is a sunny day, a cloudy day, an indoor scene lit with incandescent or neon light, human eyes can account for the color change and still recognize the white color of the object. However, for digital image capturing devices, white colors generated by different illumination sources are different from each other. For example, under a tungsten lamp, the captured images may be slightly yellow, while the captured images in other environments may be slightly blue or red. In order to match human vision, the digital image capturing devices must approximate the human visual system and adjust the colors according to the original light to define "white", and display a white color that is recognizable as such by a human observer. The above process is called a "white balance" procedure.

There are several prior art white balance adjustment methods. One is U.S. Pat. No. 6,798,449, issued on Sep. 28, 2004, which uses an R value, a G value, and a B value to obtain the average brightness and Cb-Cr values. However, if an imaged picture lacks one of the primary colors, or has a low proportion of one of the primary colors, the image will suffer from aliasing. Another prior art technology uses the brightest spot in an image for the white balance adjustment process; however, if the brightest spot in the image is not a white spot, the adjusted image will not provide the best possible picture.

Another prior art technology marks a plurality of color temperatures on a G/B-G/R coordinate graph, extracts grey points from a desired image, and converts them onto the G/B-G/R coordinate graph to determine the proper color temperature for the image. However, if the picture has a lot of background colors, or the correct color temperatures are not near the marked color temperature, the adjusted picture will still have a color difference.

Therefore, it is desirable to provide a white balance adjustment method for a digital image capturing device to mitigate and/or obviate the aforementioned problems.

SUMMARY OF THE INVENTION

An objective of the present invention is to provide a white balance adjustment method that uses color temperature estimation.

The digital image capturing device of the present invention comprises a processor, a memory and an image capturing module, and all of these elements are electrically connected to each other. The digital image capturing device uses the image capturing module to capture images, and uses the processor and memory to perform a white balance adjustment procedure.

Before the white balance adjustment procedure, a color temperature estimation area must be defined. A plurality of color temperatures are selected according to a color temperature range of a standard light source, then marked the Cb value and the Cr value of each grey point of the plurality of color temperatures on a Cb-Cr coordinate graph, and connected all points of each color temperature. Then, at least one color temperature zone and at least one white zone of the color temperature are obtained.

After the color temperature estimation area has been obtained, the digital image capturing device performs the white balance adjustment procedure.

The digital image capturing device uses the image capturing module to capture an image, and the processor divides the image into plurality of analysis blocks and analyzes each of the analysis blocks. After the analysis block is selected, its Cb value and Cr value are obtained. The processor inputs the Cb value and the Cr value of the analysis block into the color temperature estimation area to determine whether the analysis block is located in the color temperature zone or the white zone. If the analysis block is located in the color temperature zone, it is checked to determine whether the analysis block is a grey point, and the color temperature of the color temperature zone is scored one point. If the analysis block is in the white zone, it is also checked to determine whether the analysis block is a grey point, and a half point is scored for the adjacent color temperatures of the white zone.

Points for each color temperature are thus recorded, with a color temperature having the maximum collected points. A relationship between the color temperature having the maximum collected points and the adjacent color temperature is determined. If the collected points of the adjacent color temperature are close to the maximum collected points, a linear interpolation is performed between the color temperature having the maximum collected points and the points of the adjacent color temperatures to obtain a final color temperature.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
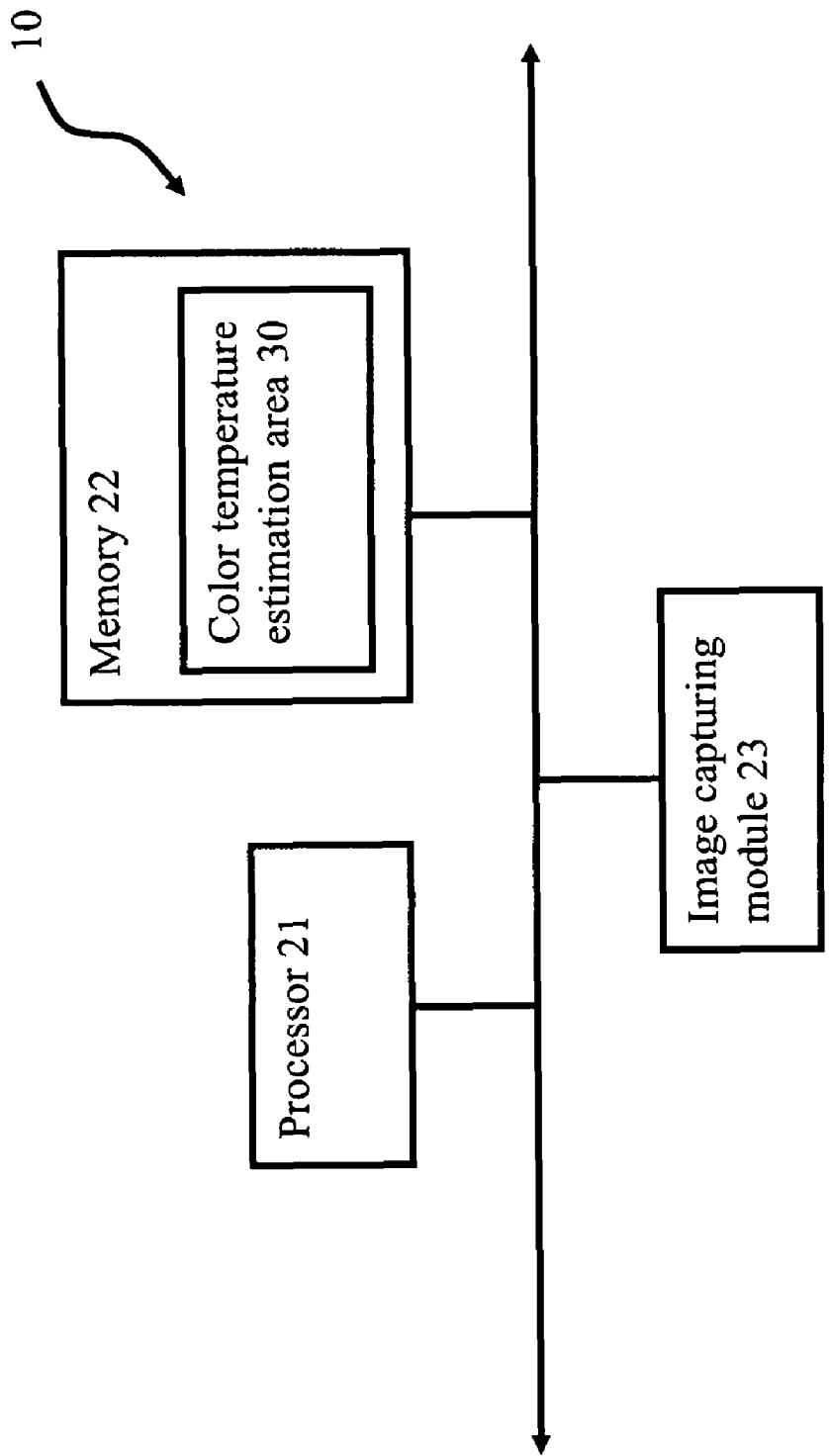
FIG. 1 is a functional block drawing of a digital image capturing device according to the present invention.

Please refer to FIG. 1. FIG. 1 is a functional block drawing of a digital image capturing device 10 according to the present invention.

A digital image capturing device 10 of the present invention comprises a processor 21, a memory 22 and an image capturing module 23, and all of these elements are electrically connected to each other. The digital image capturing device 10 uses the image capturing module 23 to capture images, and uses the processor 21 and memory 22 to perform a white balance adjustment procedure. The memory 22 stores a color temperature estimation area 30, wherein a method for obtaining the color temperature estimation area 30 will be explained later.

Figure 2:
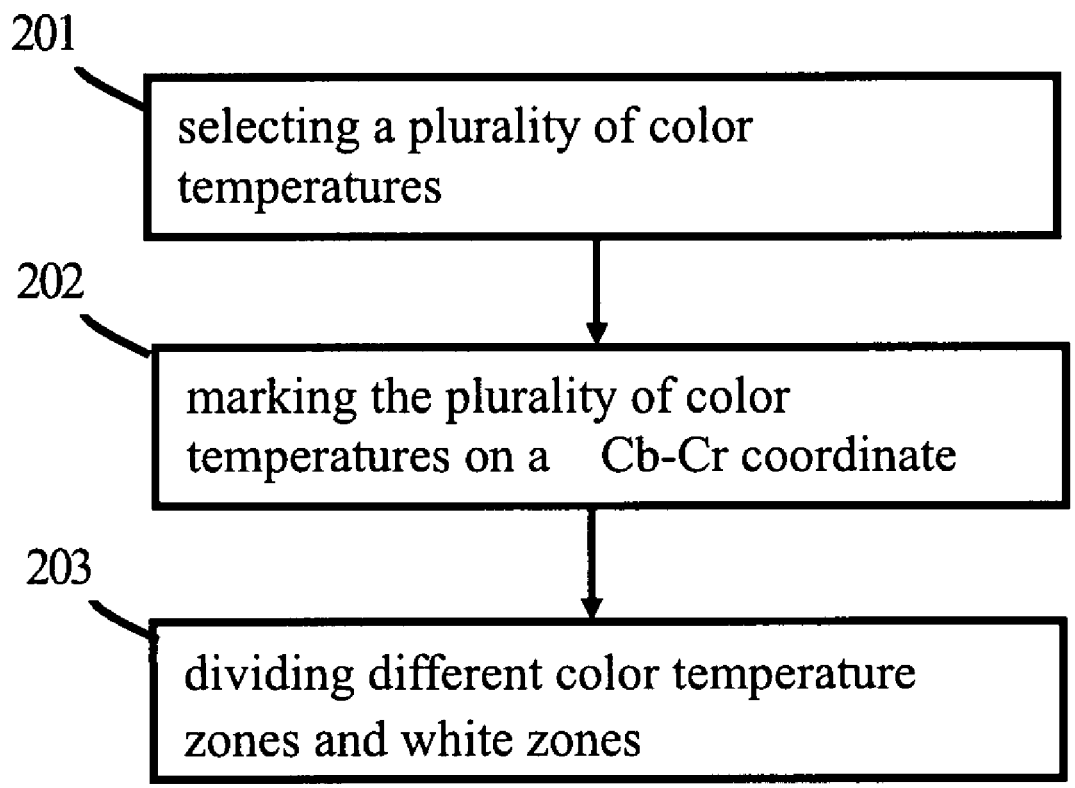
FIG. 2 is a flowchart of setting a color temperature estimation area according to the present invention.
Figure 3A:
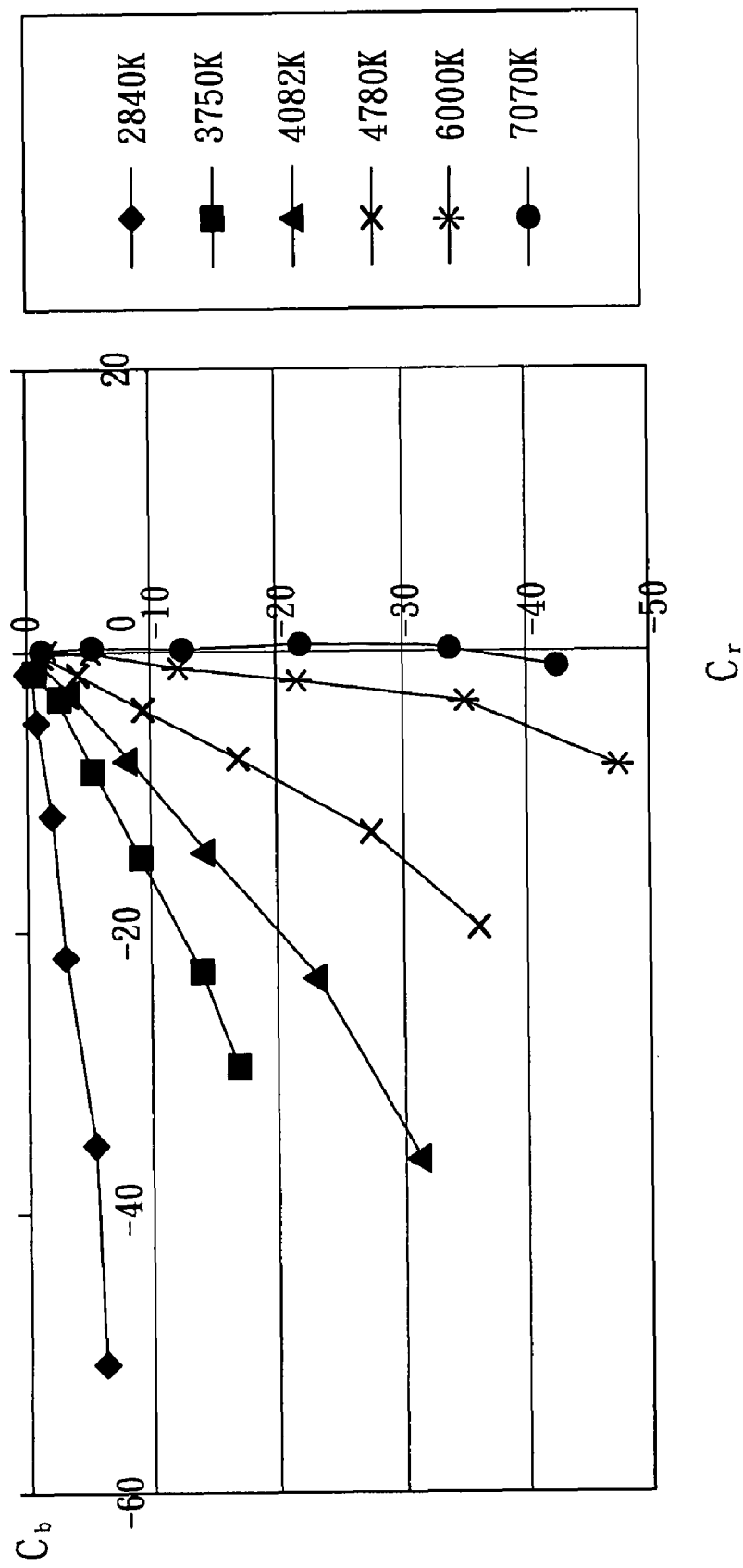
FIGS. 3a-3c illustrate setting a color temperature estimation area according to the present invention.
Figure 3B:
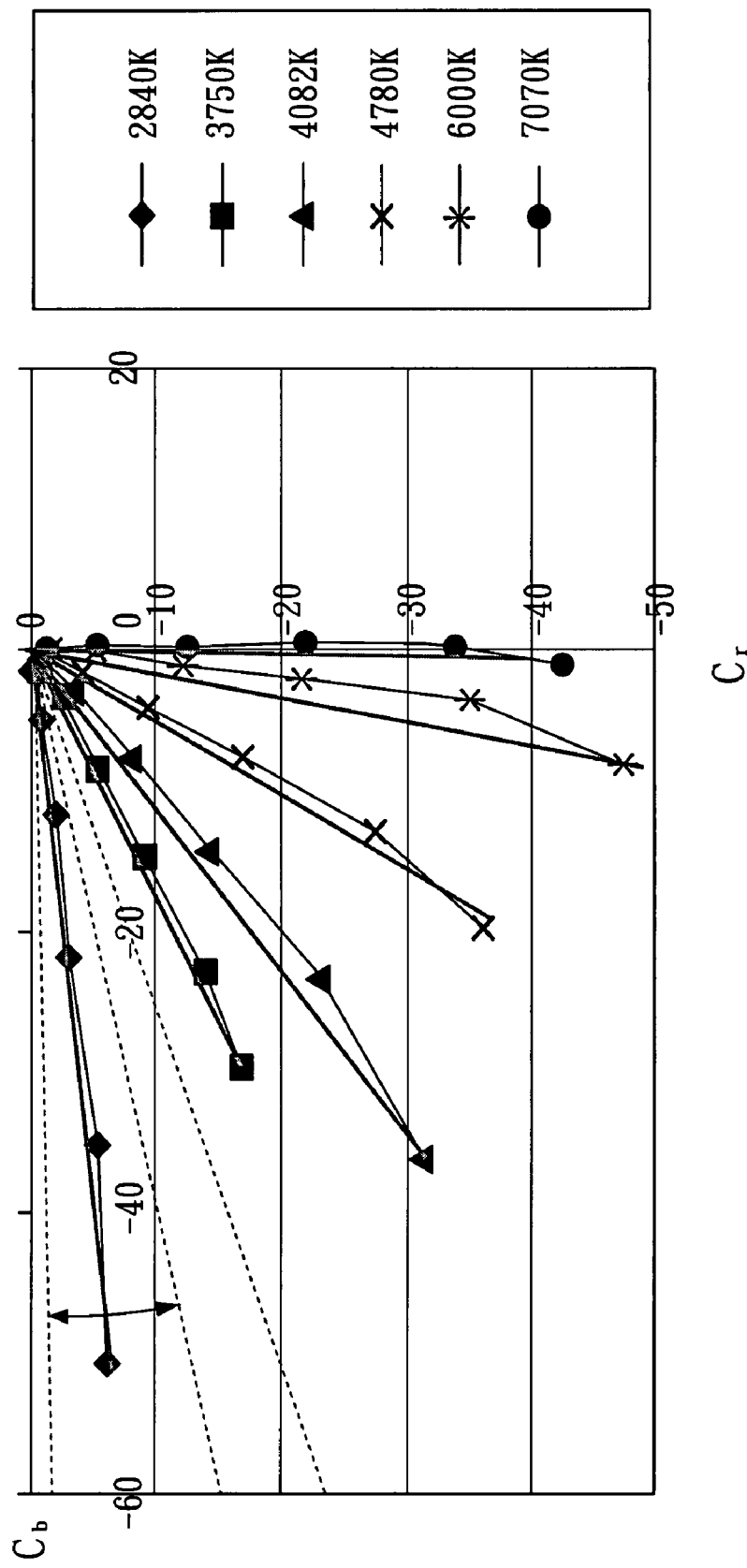
Figure 3C:
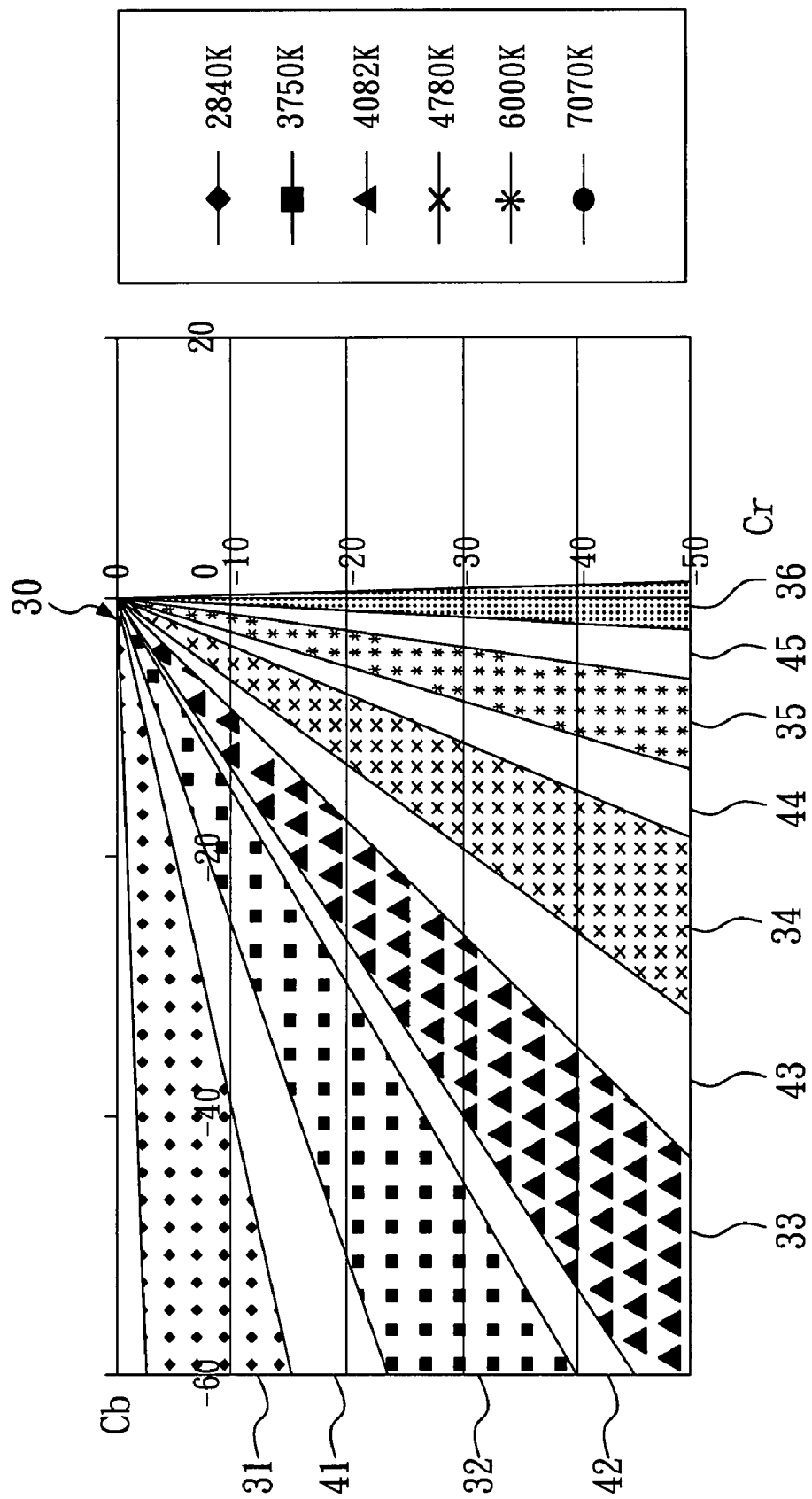

Prior to performing the white balance adjustment procedure by the digital image capturing device 10, the color temperature estimation area 30 must be defined. Please refer to FIG. 2 and FIGS. 3a-3c. FIG. 2 is a flowchart of setting a color temperature estimation area according to the present invention. FIGS. 3a-3c are schematic drawings of setting the color temperature estimation area according to the present invention.

First, in step 201: selecting a plurality of color temperatures.

A plurality of color temperatures are selected according to a color temperature range of a standard light source. The color temperature range of a standard light source is around 2500° K to 7000° K, and the present invention selects the appropriate color temperatures in the above mentioned color temperature range. In this embodiment, six different color temperature environments may be selected, which are 2840° K, 3750° K, 4082° K, 4780° K, 6000° K and 7070° K; however, various numbers of color temperature environments may be selectable.

Next, in step 202: marking the plurality of color temperatures on a Cb-Cr coordinate graph.

As shown in FIG. 3a, in the selected color temperature environments, the Cb value and the Cr value of each grey point are measured with a color checker, and the results are marked on the Cb-Cr coordinate graph. In this embodiment, each color temperature has five points; by connecting all five points of each color temperature, each color temperature curve is obtained.

Finally, in step 203: dividing different color temperature zones and white zones.

As shown in FIG. 3b, linear regression analysis is performed upon each color temperature curve to obtain regression lines for different color temperatures. Then, the area between two adjacent regression lines is evenly divided into three portions; the portion closest to each color temperature is selected, and the non-selected portion is defined as the white zone. For the regression line closest to the edge, such as the regression lines for color temperatures 2840° K and 7070° K, the divided portion along one side of this regression line is used to define the portion on the other side. A color temperature estimation area 30 as shown in FIG. 3c is obtained, and the color temperature estimation area 30 is divided into the color temperature zones 31~36, and the white zones 41~45.

Figure 4:
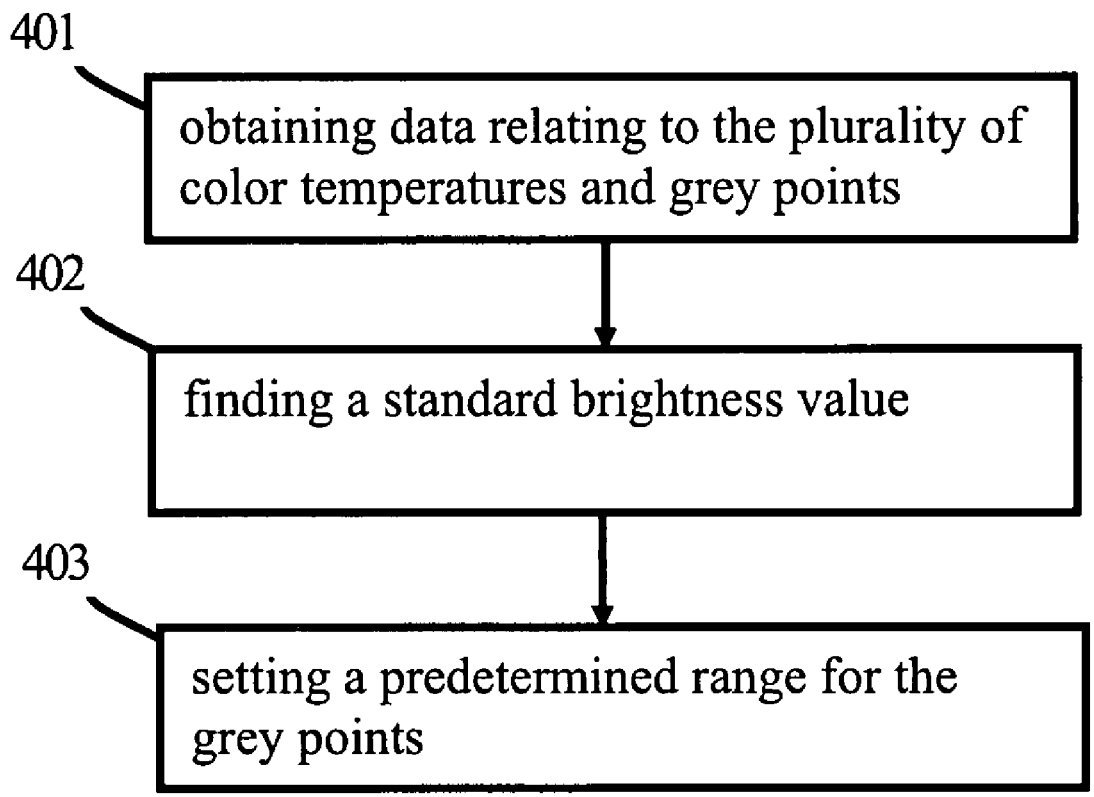
FIG. 4 is a flowchart of setting grey points in a predetermined range according to the present invention.
Figure 5A:
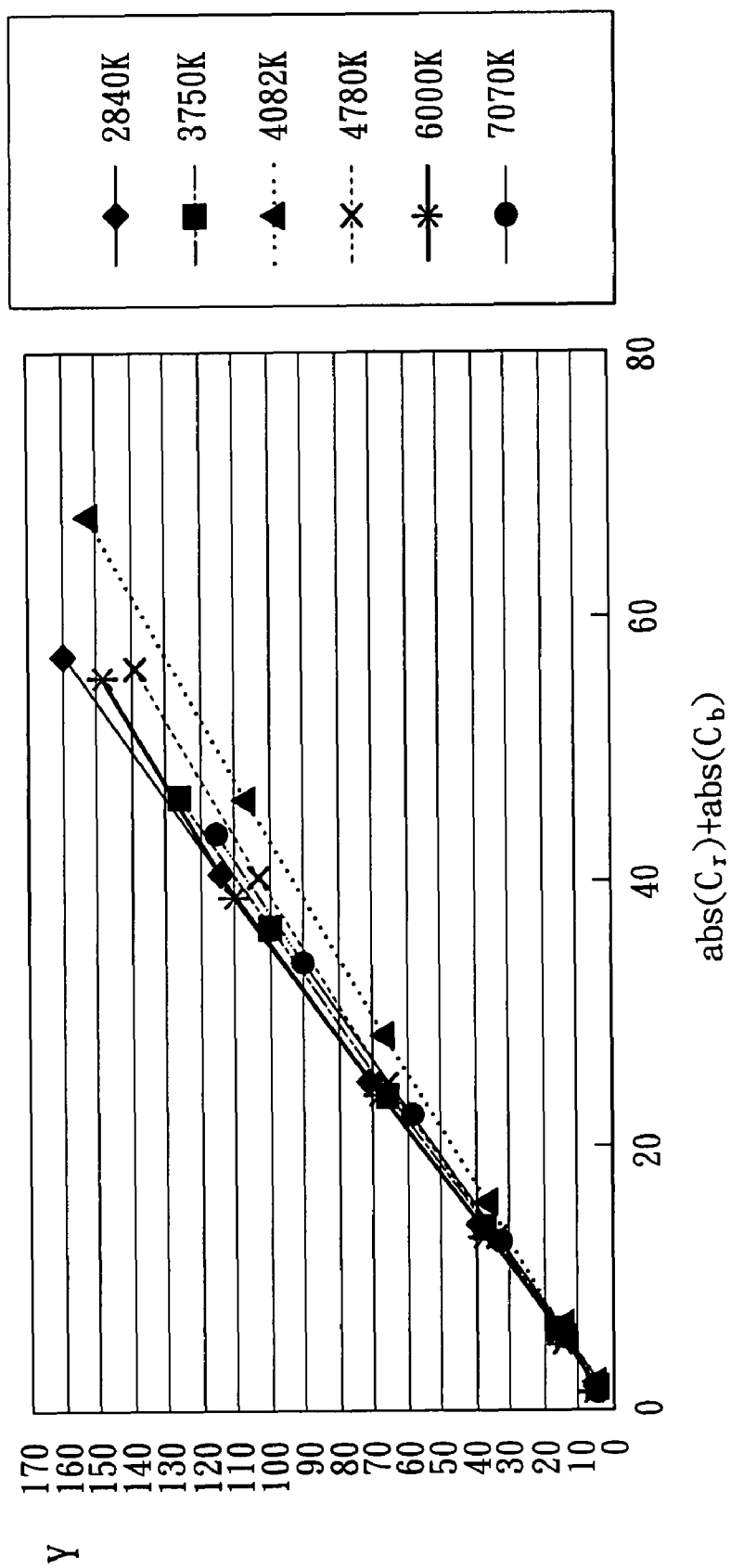
FIGS. 5a-5b are schematic drawings of identifying grey points in a predetermined range according to the present invention.
Figure 5B:
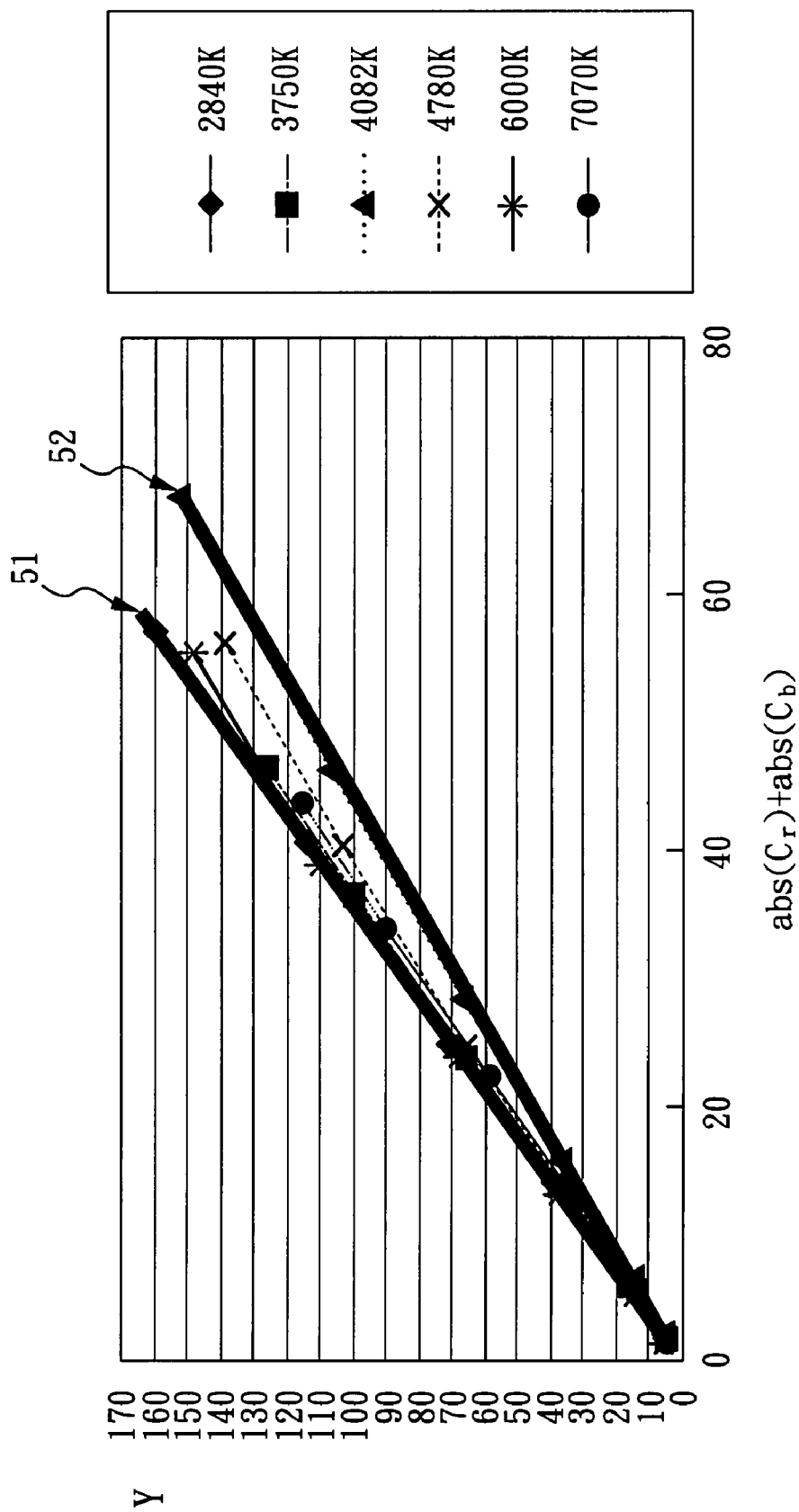

After the color temperature estimation area 30 has been obtained, the results of the division are stored in the memory 22 as data for the white balance adjustment procedure performed by the digital image capturing device 10. The data may also be used for setting a predetermined range for grey points. Please refer to FIG. 4 and FIGS. 5a-5b. FIG. 4 is a flowchart of setting grey points in a predetermined range according to the present invention. FIGS. 5a-5b are schematic drawings of identifying the grey points in the predetermined range according to the present invention.

First, in step 401: obtaining data relating to the plurality of color temperatures and grey points.

The data related to the plurality of color temperatures and grey points is identical to the data shown in FIG. 3a. As shown in FIG. 5a, in different color temperature environments, the Cb value and the Cr value of each grey point are marked on a relationship graph of Cb and Cr absolute values.

Next, in step 402: finding a standard brightness value.

Linear regression is performed upon the same color temperature curves to obtain a corresponding linear equation for the color temperatures. As shown in FIG. 5a, six corresponding lines of different color temperatures may be obtained. Subsequently, the Cr and Cb absolute value of an analysis block that is to be analyzed can be input into the corresponding linear equation of color temperature of the analysis block to obtain the standard brightness value of the analysis block.

Finally, in step 403: setting a predetermined range for the grey points.

As shown in FIG. 5b, a regression line 51 with a maximum slope and a regression line 52 with a minimum slope are selected from the regression lines shown in FIG. 5a, and may be used as the predetermined range. Any point in the predetermined range may be considered a grey point. The predetermined range for the grey points will be further explained in the following.

Figure 6A:
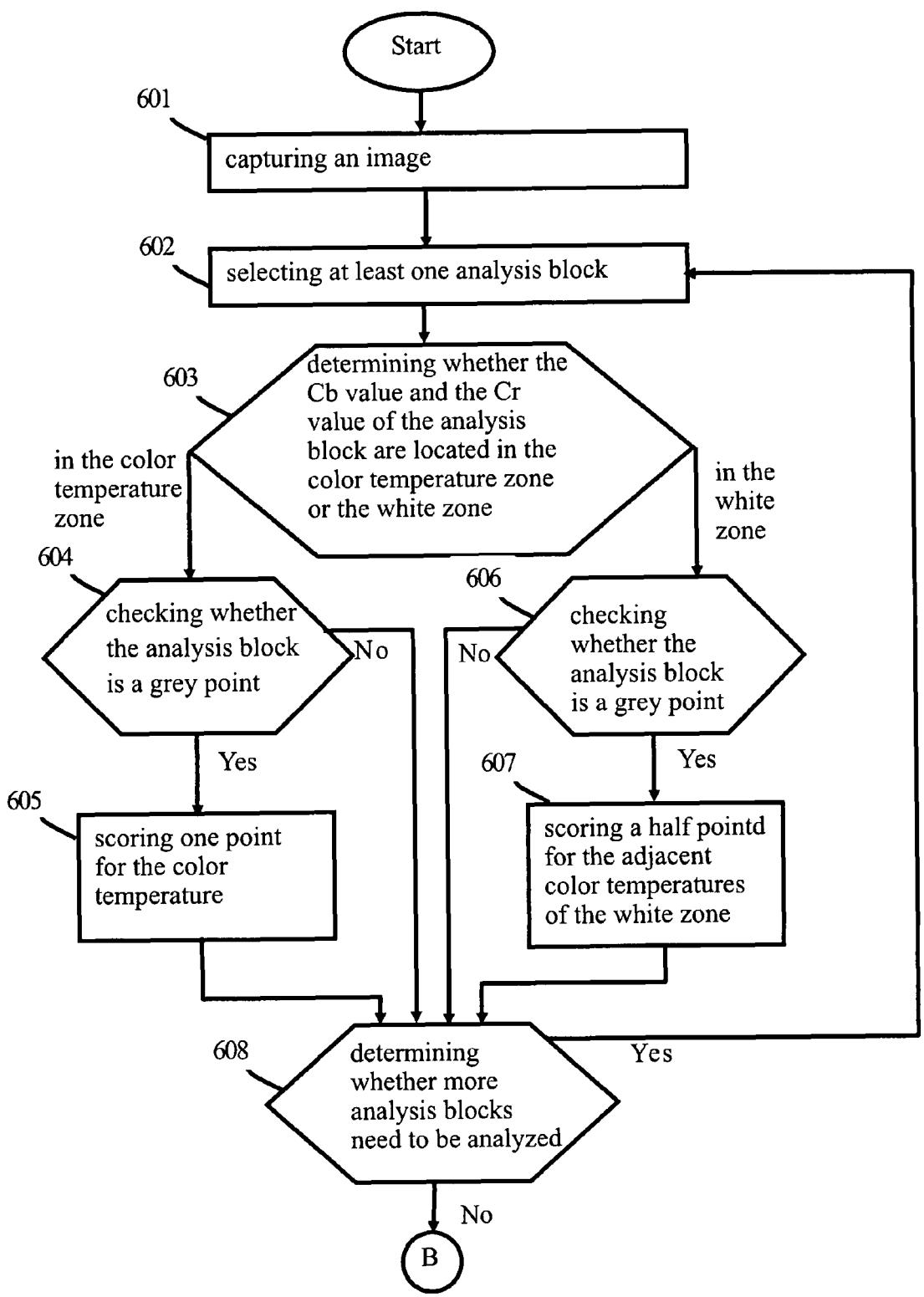
FIGS. 6a-6b are flowcharts of a white balance procedure according to the present invention.
Figure 6B:
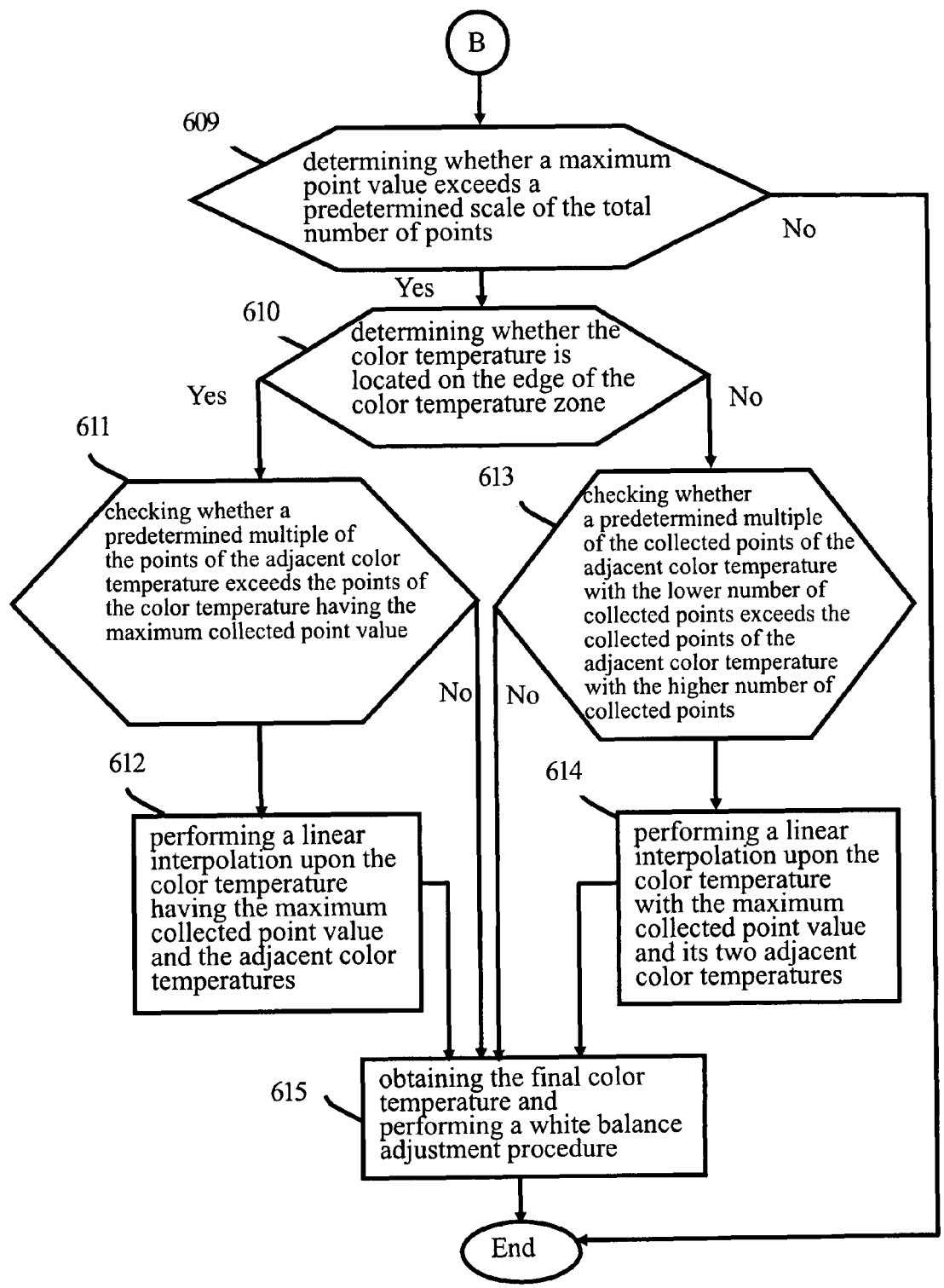

Please refer to FIGS. 6a-6b. FIGS. 6a-6b are flowcharts of a white balance procedure according to the present invention.

After the processes shown in FIG. 2 and FIG. 4, the digital image capturing device 10 begins the white balance procedure.

First, in step 601: capturing an image.

The digital image capturing device 10 uses the image capturing module 23 to capture an image, and the processor 21 automatically performs the white balance adjustment to the image.

Next, in step 602: selecting at least one analysis block.

The processor 21 divides the image into at least one analysis block and analyzes the analysis block.

In step 603: determining whether the Cb value and the Cr value of the analysis block are located in the color temperature zone or the white zone.

After the analysis block is selected, its brightness value, Cb value, and Cr value are obtained. The processor 21 inputs the Cb value and the Cr value of the analysis block into the color temperature estimation area 30 shown in FIG. 3c to determine whether the analysis block is in the color temperature zone or the white zone. If the analysis block is in the color temperature zone, step 604 is performed; if the analysis block is in the white zone, then step 606 is performed.

In step 604: checking whether the analysis block is a grey point.

When the analysis block is located in the color temperature zone, the analysis block is checked to determine if it is a grey point. According to FIG. 5a, if the brightness value of the analysis block is within the predetermined range of the standard brightness value, this analysis block can be considered a grey point for subsequent analysis. In this embodiment, the predetermined range of the standard brightness value is set as a range around the standard brightness value ±5, but the range may vary for other embodiments of the present invention. If the brightness value of the analysis block is not within the predetermined range, the analysis block is not a grey point, and there is no need for further analysis, and step 608 is performed.

Next, in step 605: scoring one point for the color temperature.

The color temperature with its color temperature zone having the Cb value and the Cr value of the analysis block in the color temperature estimation area 30 is scored one point. For example, if it is located in the color temperature zone 31, 2840° K scores one point.

In step 606: checking whether the analysis block is a grey point.

When the analysis block is located in the white zone, it needs to determine whether the brightness of the analysis block is within the predetermined range of the relationship graph of brightness and Cb-Cr absolute values. The Cb-Cr absolute values of the analysis block is brought into FIG. 5b to determine whether the brightness value of the analysis block is within the predetermined range; if it is within the predetermined range, the analysis block is considered a grey point, and further analysis may be performed. If it is not in the predetermined range, the analysis block is not considered a grey point, no further analysis is required, and step 608 is performed.

In step 607: scoring a half pointed for the adjacent color temperatures of the white zone.

For example, if a Cb/Cr ratio value of the analysis block is in the white zone 41, the adjacent color temperatures of the white zone 41 are 2840° K and 3750° K, and a half point is scored for 2840° K and 3750° K.

In step 608: determining whether more analysis blocks need to be analyzed.

If another analysis block exists, the process repeats from step 602. If there are no more analysis blocks, step 609 is performed.

In step 609: determining whether a maximum point value exceeds a predetermined scale of the total number of points.

Based upon the above steps, a color temperature having the maximum number of collected points may be obtained. The maximum collected point value is compared to the total number of points of the analysis blocks. If the maximum collected point value does not exceed a predetermined scale of the total number of points, such as 1/3000 of the total number of points, this may indicate that there are not enough analysis blocks in this image to be used as grey points, and therefore the white balance adjustment procedure should not be performed. If the maximum collected point value exceeds the predetermined scale, step 610 may be performed.

In step 610: determining whether the color temperature is located on the edge of the color temperature zone.

If the color temperature with the maximum collected point value is located on the edge of the color temperature zone, this may indicate that it is located in the color temperature zone 31 or the color temperature zone 36. If the color temperature having the maximum collected point value is located in these two zones, step 611 is performed; otherwise, step 613 is performed.

In step 611: checking whether a predetermined multiple of the points of the adjacent color temperature exceeds the points of the color temperature having the maximum collected point value.

If the points of the adjacent color temperature multiplied by a predetermined multiplier exceed the maximum collected point value, this may indicate that the adjacent color temperature should be factored into the white balance adjustment procedure, and step 612 is performed. If it does not exceed the maximum collected point value, the color temperature having the maximum collected point value is considered a final color temperature, and the white balance adjustment procedure is performed.

In step 612: performing a linear interpolation upon the color temperature having the maximum collected point value and the adjacent color temperatures.

Based on a collected point relationship between the color temperature with the maximum collected point value and the points of the adjacent color temperatures, a linear interpolation is performed to obtain a value to be used as a final color temperature.

In step 613: checking whether a predetermined multiple of the collected points of the adjacent color temperature with the lower number of collected points exceeds the collected points of the adjacent color temperature with the higher number of collected points.

When the color temperature with the maximum collected point value has two adjacent color temperatures, the relationship between the two adjacent color temperatures may be considered. If a predetermined multiple of the collected points of the adjacent color temperature having the lower number of collected points exceeds the collected point value of the adjacent color temperature having the higher number of collected points, step 614 is performed. If it does not exceed the collected point value of the adjacent color temperature with the higher number of collected points, the color temperature with the maximum collected point value is taken as the final color temperature, and the white balance adjustment is performed.

In step 614: performing a linear interpolation upon the color temperature with the maximum collected point value and its two adjacent color temperatures.

According to the relationship between the point of the color temperature with the maximum collected point value and the points of its two adjacent color temperatures, a linear interpolation is performed, and the resultant value is taken as the final color temperature.

Finally, in step 615: obtaining the final color temperature and performing a white balance adjustment procedure.

After the above steps, the final color temperature is obtained, and the processor 21 uses the final color temperature to perform a white balance adjustment to the image to obtain the best image picture.

Although the present invention has been explained in relation to its preferred embodiment, it is to be understood that many other possible modifications and variations can be made without departing from the spirit and scope of the invention as hereinafter claimed.

What is claimed is:

1. A white balance adjustment method for a digital image capturing device, the method comprising:
   setting a color temperature estimation area, which comprises: dividing a Cb-Cr coordinate graph according to different color temperatures that define a number of color temperature curves to obtain at least one color temperature zone and at least one white zone through linear regression analysis; wherein the linear regression analysis is performed upon each color temperature curve to obtain regression lines for the different color temperatures; the area between two adjacent regression lines is evenly divided into three portions; the portion closest to each color temperature is defined as the at least one color temperature zone, and the non-selected portion is defined as the at least one white zone; and
   performing a white balance procedure, which comprises: capturing an image; choosing at least one analysis block from the image; obtaining a brightness value, a Cb value, and a Cr value of the at least one analysis block; determining whether the Cb value and the Cr value of the at least one analysis block are located at either the at least one color temperature zone or the at least one white zone of the color temperature estimation area; collecting each point value of each color temperature in the color temperature estimation area; calculating with each point value of each color temperature to obtain a final color temperature; and performing a white balance adjustment procedure to the image according to the final color temperature.

2. The white balance adjustment method as claimed in claim 1 further comprising: determining whether the brightness value, the Cb value, and the Cr value of the at least one analysis block are located in a predetermined range on a relation graph of brightness and Cb-Cr absolute values.

3. The white balance adjustment method as claimed in claim 1, wherein the step of collecting each point value of each color temperature in the color temperature estimation area further comprises: adding a point for a color temperature when the Cb value and the Cr value of the at least one analysis block are located in the at least one color temperature zone; or adding a half point for each of two color temperatures adjacent to the white zone when the Cb value and the Cr value of the at least one analysis block are located in the at least one white zone; and collecting all point values to obtain a color temperature with the highest point value and at least one adjacent color temperature.

4. The white balance adjustment method as claimed in claim 3 further comprising: determining whether the color temperature with the highest point value exceeds a predetermined scale of a total number of points in the at least one analysis block.

5. The white balance adjustment method as claimed in claim 3 further comprising: determining whether the point value of the color temperature with the highest point value is less than a predetermined multiple of the point value of the at least one adjacent color temperature.

6. The white balance adjustment method as claimed in claim 5 further comprising: performing a linear interpolation to the color temperature with the highest point value and the at least one adjacent color temperature to obtain the final color temperature.

7. The white balance adjustment method as claimed in claim 3 further comprising: determining whether the point value of one of the at least one adjacent color temperature with a higher point value is less than a predetermined multiple of the point value of another one of the at least one adjacent color temperature with a lower point value.

8. The white balance adjustment method as claimed in claim 7 further comprising: performing a linear interpolation to the color temperature with the highest point value, the adjacent color temperature with the higher point value, and the adjacent color temperature with the lower point value to obtain the final color temperature.

9. A digital image capturing device comprising: a processor; a memory electrically connected to the processor for storing a color temperature estimation area, the color temperature estimation area dividing a Cb-Cr coordinate graph according to different color temperatures that define a number of color temperature curves to obtain at least one color temperature zone and at least one white zone through linear regression analysis, wherein the linear regression analysis is performed upon each color temperature curve to obtain regression lines for the different color temperatures; the area between two adjacent regression lines is evenly divided into three portions; the portion closest to each color temperature is defined as the at least one color temperature zone, and the non-selected portion is defined as the at least one white zone; and an image capturing module electrically connected to the processor; wherein the processor is capable of performing the following means: capturing an image; choosing at least one analysis block from the image; obtaining a brightness value, a Cb value, and a Cr value of the at least one analysis block; determining whether the Cb value and the Cr value of the at least one analysis block are located at either the at least one color temperature zone or the at least one white zone of the color temperature estimation area; collecting each point value of each color temperature in the color temperature estimation area; calculating with each point value of each color temperature to obtain a final color temperature; and performing a white balance adjustment procedure to the image according to the final color temperature.

10. The digital image capturing device as claimed in claim 9, wherein the processor further determines whether the brightness value, the Cb value, and the Cr value of the at least one analysis block are located in a predetermined range on a relation graph of brightness and Cb-Cr absolute values.

11. The digital image capturing device as claimed in claim 9, wherein when the processor collecting each point value of each color temperature in the color temperature estimation area, the processor further performs the following means: adding a point for a color temperature when the Cb value and the Cr value of the at least one analysis block are located in the at least one color temperature zone; or adding a half point for each of two color temperatures adjacent to the white zone when the Cb value and the Cr value of the at least one analysis block are located in the at least one white zone; and collecting all point values to obtain a color temperature with the highest point value and at least one adjacent color temperature.

12. The digital image capturing device as claimed in claim 11, wherein the processor further determines whether the color temperature with the highest point value exceeds a predetermined scale of a total number of points in the at least one analysis block.

13. The digital image capturing device as claimed in claim 11, wherein the processor further determines whether the point value of the color temperature with the highest point value is less than a predetermined multiple of the point value of the at least one adjacent color temperature.

14. The digital image capturing device as claimed in claim 13, wherein the processor further performs a linear interpolation to the color temperature with the highest point value and the at least one adjacent color temperature to obtain the final color temperature.

15. The digital image capturing device as claimed in claim 11, wherein the processor further determines whether the point value of the adjacent color temperature with a higher point value is less than a predetermined multiple of the point value of the adjacent color temperature with a lower point value.

16. The digital image capturing device as claimed in claim 15, wherein the processor further performs a linear interpolation to the color temperature with the highest point value, the adjacent color temperature with the higher point value, and the adjacent color temperature with the lower point value to obtain the final color temperature.

* * * * *